(12) United States Patent
Coffman et al.

(10) Patent No.: US 8,413,677 B1
(45) Date of Patent: Apr. 9, 2013

(54) SYSTEM FOR ACCELERATING RELIEF VALVE OPENING

(75) Inventors: William Paul Coffman, Houston, TX (US); Charles Leland Patrick, Cypress, TX (US)

(73) Assignee: Expro Americas, LLC, Houston, TX (US)

( * ) Notice: Subject to any disclaimer, the term of this patent is extended or adjusted under 35 U.S.C. 154(b) by 369 days.

(21) Appl. No.: 12/928,744

(22) Filed: Dec. 17, 2010

Related U.S. Application Data (60) Provisional application No. 61/403,131, filed on Sep. 10, 2010.

(51) Int. Cl.
*F16K 31/12* (2006.01)
*F16K 31/02* (2006.01)
*G05D 16/20* (2006.01)

(52) U.S. Cl.
USPC ...... 137/488; 137/487.5; 251/28; 251/129.04

(58) Field of Classification Search ............... 251/30.01, 251/129.04, 31, 28, 489.5; 137/487.5, 488, 137/485, 565.34, 565.14, 565.17; 60/413, 60/416
See application file for complete search history.

(56) References Cited

U.S. PATENT DOCUMENTS

| 4,215,844 | A | * | 8/1980 | Bowen | 251/28 |
| 5,520,499 | A | * | 5/1996 | Ufheil et al. | 414/685 |
| 5,660,198 | A | * | 8/1997 | McClaran | 137/12 |
| 6,584,999 | B2 | * | 7/2003 | Inayama et al. | 137/487.5 |
| 7,243,494 | B2 | * | 7/2007 | Evans | 60/469 |
| 7,634,909 | B1 | * | 12/2009 | Chatterjea | 60/338 |
| 2002/0030170 | A1 | * | 3/2002 | McKell et al. | 251/129.04 |
| 2011/0030816 | A1 | * | 2/2011 | Kauss | 137/488 |

* cited by examiner

*Primary Examiner* — Stephen M Hepperle
*Assistant Examiner* — Daphne M Barry
(74) *Attorney, Agent, or Firm* — Elizabeth R. Hall (57) ABSTRACT

A pressure relief valve control system provides a method and apparatus for rapidly closing a relief valve in response to excess fluid pressure. The system uses a programmable controller to rapidly communicate pressure changes to a solenoid actuated valve and two control valves. The solenoid actuated valve has a dedicated accumulator and the two control valves have another dedicated accumulator.

20 Claims, 4 Drawing Sheets

SYSTEM FOR ACCELERATING RELIEF VALVE OPENING

CROSS REFERENCE TO RELATED APPLICATIONS

This application claims priority to pending U.S. Patent Application Ser. No. 61/403,131, filed Sep. 10, 2010 and entitled "System for Accelerating Relief Valve Opening."

BACKGROUND OF THE INVENTION

1. Field of the Invention

The present invention relates to a method and apparatus for accelerating the opening of a relief valve. More particularly, the present invention relates to a method and apparatus for enhancing the rapidity of opening a relief valve in response to measured overpressure.

2. Description of the Related Art

Relief valves are used for processes involving flow to ensure that excessive system pressures will not cause major failures in the system. Typical relief valve control systems are used to control the relief valves associated with mud pumps on drilling rigs. These pumps are high powered and deliver fluids at high flow rates and delivery pressures.

Starting a pump against a closed valve or a plugged line will invariably result in major damage to the system unless the relief valve for the mud system opens extremely quickly. The currently available relief valves for mud systems are slow to open, so that failures often occur.

Currently used mud pumps accelerate rapidly and can quickly fill any damping accumulators and excessively pressurize the system before conventional relief valves can react to relieve the excessive pressures. Reaction times of less than 0.5 second are needed for mud pump relief valves. Even with the rapid measurement of system pressure, valve mechanical response times for existing valves are excessive.

A need exists for improved means to rapidly open mud system relief valves.

SUMMARY OF THE INVENTION

Embodiments of the present invention relate to a pressure relief valve control system for rapidly closing a relief valve in response to excess fluid pressure. The system uses a programmable controller to rapidly communicate pressure changes to a solenoid actuated valve and two control valves. The solenoid actuated valve has a dedicated accumulator and the two control valves have another dedicated accumulator.

One embodiment includes a pressure relief valve control system comprising: (a) a normally closed relief valve having a selectably operable double acting cylinder with a first port and a second port, wherein the cylinder moves to a first position or a second position in response to changes in measured fluid pressure changes, wherein increased fluid pressure in the first port moves the cylinder to the first position to open the relief valve and increased fluid pressure in the second port moves the cylinder to the second position to close the relief valve; (b) a hydraulic pump and a hydraulic reservoir; (c) a first accumulator and a second accumulator charged by the hydraulic pump from fluid in the reservoir; and (d) a valve control system including (i) a pressure sensing device for monitoring the fluid pressure changes, (ii) a solenoid controlled valve responsive to the pressure sensing device and in fluid communication with the first accumulator, the reservoir, and a pilot pressure line; (iii) a first control valve connected to a first side of the cylinder, wherein the first control valve is in fluid communication with the second accumulator, the pilot pressure line, the reservoir, and the first port; and (iv) a second control valve connected to a second side of the cylinder, wherein the second control valve is in fluid communication with the second accumulator, the pilot pressure line, the reservoir, and the second port; whereby whenever the pressure sensing device senses a fluid pressure greater than a predetermined pressure an electronic signal is sent to the solenoid operated valve that opens the pilot pressure line to a fluid pressure in the second accumulator thereby activating the first and second control valves to open the relief valve.

Another embodiment includes a pressure relief valve control system comprising: (a) a normally closed relief valve having a selectably operable double acting cylinder with a first port and a second port, wherein the cylinder moves to a first position or a second position in response to changes in measured fluid pressure changes, wherein increased fluid pressure in the first port moves the cylinder to the first position to open the relief valve and increased fluid pressure in the second port moves the cylinder to the second position to close the relief valve; (b) a hydraulic pump and a hydraulic reservoir; (c) a first accumulator and a second accumulator charged by the hydraulic pump from fluid in the reservoir; and (d) a valve control system closely coupled to the relief valve, the hydraulic pump and reservoir, and the first and second accumulators, wherein the valve control system includes (i) a pressure sensing device for measuring fluid pressure changes, (ii) a programmable logic controller for monitoring the fluid pressure changes and sending out an electronic signal whenever the measured fluid pressure exceeds a predetermined desirable pressure, (iii) a solenoid controlled valve responsive to the electronic signal from the programmable logic controller and in fluid communication with the first accumulator and a pilot pressure line; (iv) a first control valve connected to a first side of the cylinder, wherein the first control valve is in fluid communication with the second accumulator, the pilot pressure line, the reservoir, and the first port; and (v) a second control valve connected to a second side of the cylinder, wherein the second control valve is in fluid communication with the second accumulator, the pilot pressure line, the reservoir, and the second port; whereby whenever the solenoid operated valve responds to the electronic signal to open the pilot pressure line to a fluid pressure in the second accumulator thereby activating the first and second control valves to open the relief valve.

Yet another embodiment includes a pressure relief valve control system comprising: (a) a normally closed relief valve having a selectably operable double acting cylinder with a first port and a second port, wherein the cylinder moves to a first position or a second position in response to changes in measured fluid pressure changes, wherein increased fluid pressure in the first port moves the cylinder to the first position to open the relief valve and increased fluid pressure in the second port moves the cylinder to the second position to close the relief valve; (b) a hydraulic pump and a hydraulic reservoir coupled to the pressure relief valve; and (c) a valve control system including (i) a pressure sensing device for monitoring the fluid pressure changes, (ii) a programmable logic controller in communication with the pressure sensing device, (iii) a solenoid controlled valve responsive to an electronic signal sent by the programmable logic controller in response to a detected pressure that exceeds a predetermined pressure, (iv) a first accumulator dedicated to the solenoid controlled valve, wherein the first accumulator is charged by the hydraulic pump from fluid in the reservoir, (v) a pilot pressure line, wherein whenever the solenoid controlled valve responds to excessive pressure the fluid in the first accumulator flows down the pilot pressure line, (vi) a first pilot operated control valve connected to a first side of the cylinder, wherein the first control valve is in fluid communication with a second accumulator, the pilot pressure line, the reservoir, and the first port; and (vii) a second pilot operated control valve connected to a second side of the cylinder, wherein the second control valve is in fluid communication with the second accumulator, the pilot pressure line, the reservoir, and the second port; whereby whenever the electronic signal is sent to the solenoid operated valve that opens the pilot pressure line to fluid flowing from the second accumulator thereby activating the first and second control valves to open the relief valve.

The foregoing has outlined rather broadly several aspects of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

A relief valve control and operator system 10 is described that consists of two intimately coacting subsystems. The first subsystem 100 is the relief valve with its operating hydraulic cylinder. The second subsystem 11 is the control and operating system. The relief valve control and operator system 10 is designed for high pressure service in abrasive drilling mud.

The Relief Valve and Operating Cylinder

The relief valve 101 has a hydraulic operating cylinder 110 directly mounted to the relief valve body 102. The operating Cylinder 110 serves to both open and close the relief valve 101.

The relief valve 101 is normally closed. Fast cycling of the relief valve 101 is not desirable, but fast opening is. With all hydraulic components located either directly on the relief valve 101 in a manifold block 24 or immediately adjacent the relief valve, response times are minimized. One exception to this principle is that it is unnecessary to locate the electronic pressure sensors or the electronic controller for the relief valve and its hydraulic control system 10 immediately adjacent the relief valve 101, due to the rapid response time of electronics.

Figure 1:
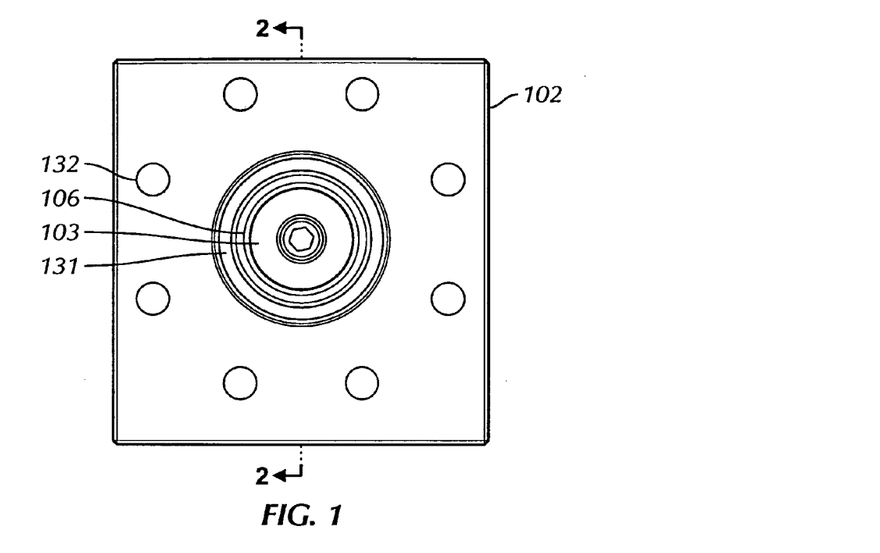
FIG. 1 shows an outlet end view of the relief valve on which the control system of the present invention is located.
Figure 2:
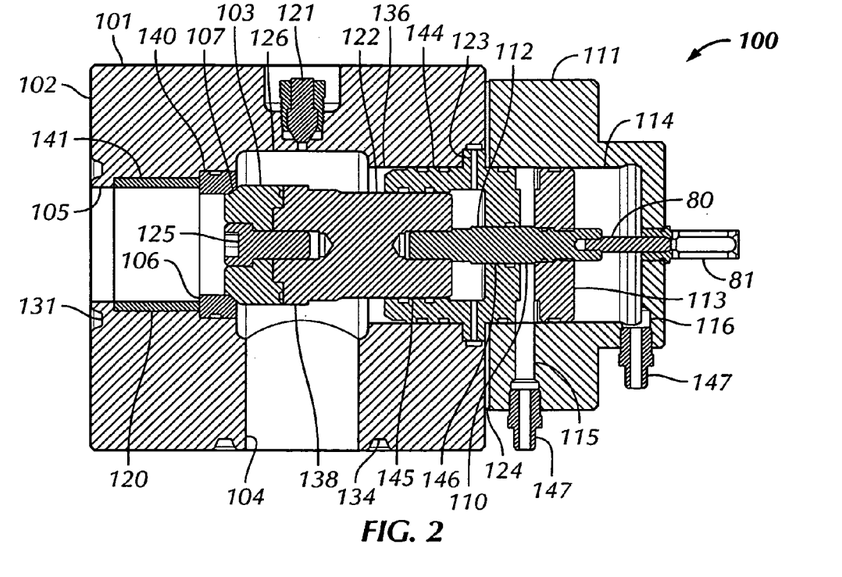
FIG. 2 shows a longitudinal cross-sectional view, taken along the line 2-2 of FIG. 1.
Figure 3:
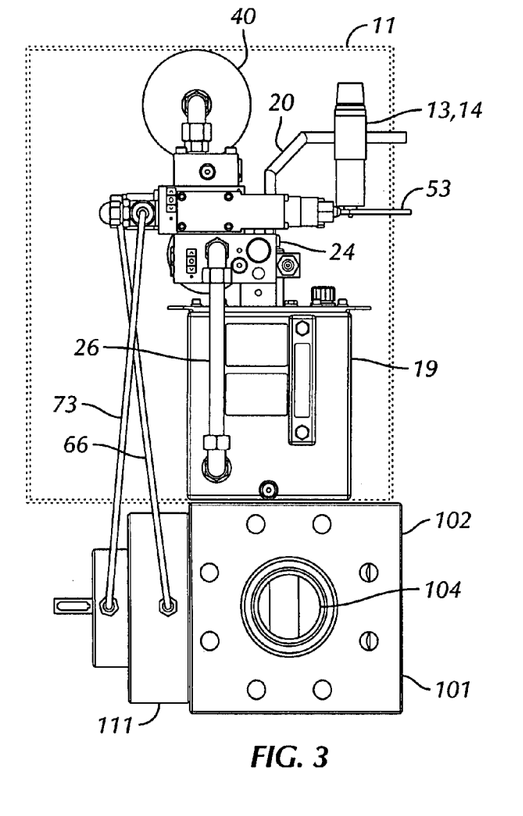
FIGS. 3, 4, and 5 are orthogonal views showing the intimate mounting of the hydraulic control system on the pressure relief valve.
Figure 4:
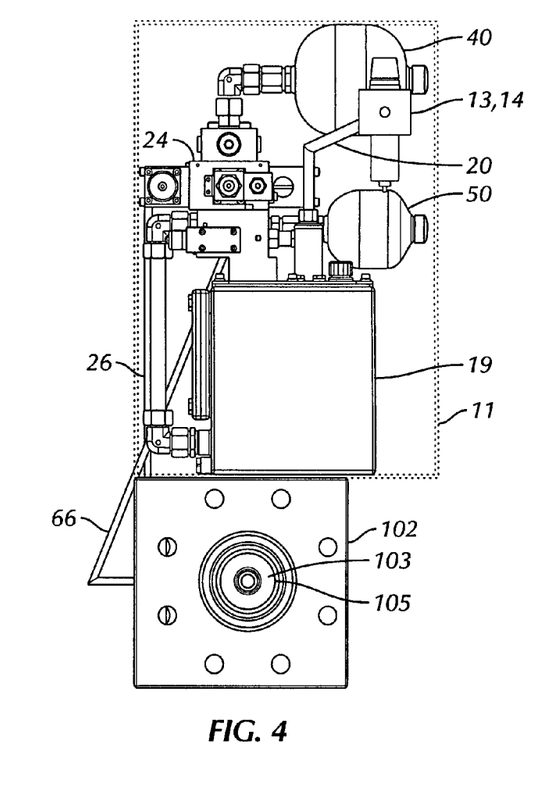
Figure 5:
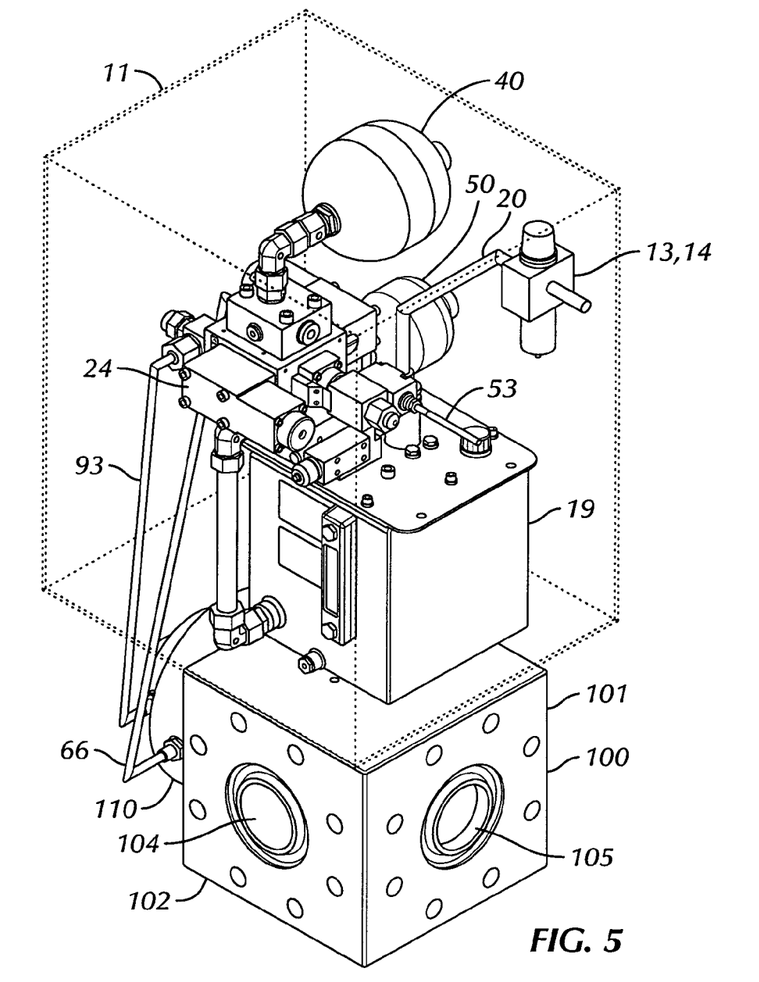

Referring to FIGS. 1 and 2, the relief valve and operating cylinder 100 consists of a valve body 102 and a sealing poppet 138 consisting of sealing plug 103 and carrier cylinder 122. The rectangular prismatic body 102 is provided with an inlet port 104 on one side and has a cylindrical central cavity 126 with a coaxial central outlet port 105 at the first end of the body.

The outlet port 105 at the first end of the body 102 is provided with a concentric cylindrical seal groove 131 for a metallic annular sealing ring (not shown). The outlet port 105 also has a parallel concentric circular array of tapped holes 132 (seen in FIG. 1) for mounting threaded studs used for connection to the outlet piping of the mud system. A cylindrical passage 136 coaxial with the central cavity 126 extends from the central cavity 126 to an opening in the opposed second end of the body 102. A regular circular array of drilled and tapped holes (not shown) is concentric with the opening located on the second end of the body 102. These tapped holes serve to mount threaded studs (not shown) to provide connecting means to the valve body 102 for the operating cylinder 110.

Similarly to the outlet port 105, the inlet port 104 of the relief valve body 102 is provided with a groove 134 for a metallic annular sealing ring (not shown) and a circular array of tapped holes for mounting threaded studs used for sealing structural connection to the inlet piping of the mud system (not shown). The cylindrical central cavity 126 of the body 102 has a pair of stepped counterbores 140, 141 at its outlet end. A thin wall cylindrical wear sleeve 120 is housed in the wear sleeve counterbore 141 closest to the first end of the body 102, while the cylindrical valve seat 106 is housed in the larger, shorter seat counterbore 140 adjacent the outlet end of the cylindrical central cavity 126. Typically, the wear sleeve 120 is made of a wear resistant material and is replaceable.

The valve seat 106 is a short cylindrical sleeve of hard wear resistant material having an annular external groove for a circumferential seal which seals between the outer diameter of the valve seat and the seat counterbore 140 of the body 102. The valve seat 106 is pressed into its counterbore 140. The interior edge of the valve seat 106 on its inlet side has a frustroconical taper sealingly comatable with a corresponding frustroconical face 107 on the sealing plug outlet end of the sealing plug 103.

As seen in FIG. 2, the relief valve 101 utilizes a cylindrical poppet 138, consisting of sealing plug 103 and carrier cylinder 122, which is normally seated against its seat 106 so that the valve 101 is normally closed. The sealing plug 103 is a short cylindrical section having a frustroconical face 107 at its outer end, wherein the frustroconical face is comatable with the corresponding frustroconical face of the seat 106. The sealing plug 103 has on its outlet end a through hole with a outwardly facing counterbore for the head of a retention screw 125. The opposed transverse end to the of the sealing plug 103 has a shallow central counterbore and an annular face groove holding a seal near its outer periphery.

The carrier cylinder 122 of the cylindrical poppet 138 has coaxial opposed drilled and tapped holes on its transverse ends. The end of the carrier cylinder 122 abutting the sealing plug 103 has a short cylindrical extension which is a close fit to the counterbore on the inlet end of the sealing plug. A screw 125 engaged in the threaded hole on the outlet end of the carrier cylinder 122 retains the sealing plug 103, while an O-ring mounted in the annular face groove of the sealing plug 103 seals between the two adjacent parts 103 and 122. On the face of the relief valve body 102 opposed to the inlet port 104 is a drilled and tapped hole coaxial with the inlet port 104 and mounting a pressure port sealing plug assembly 121.

The end of the relief valve body 102 opposed to the end having the outlet port 105 has a axially short counterbore at its outer end. The cylinder rod end 144 is a stepped cylinder having a substantially constant outer diameter except for a short transverse flange located in its central portion. Multiple external annular grooves on the first end of cylinder rod end 144 house annular seals which seal between the cylinder rod end outer diameter and the cylindrical passage 136 of the valve body 102. The transverse flange of the cylinder rod end is sealingly engaged with the counterbore on the external end of the cylindrical passage 136 of the valve body 102.

The cylinder rod end 144 has a through bore 146 which has a close fit to the outer diameter of the central portion of the cylinder rod 112. A female annular groove housing an annular seal sealingly comatable with the outer diameter of the cylinder rod 112 is located in the through bore 146 of the cylinder rod end 144. The end of the cylinder rod end 144 entered into the cylindrical passage 136 of the valve body 102 has a counterbore 145 having female annular seal grooves located on that end. The counterbore 145 is a close slip fit to the outer diameter of the inlet end of the of the carrier cylinder 122, and annular female seals seal between the counterbore and the external cylindrical surface of the carrier cylinder 122.

One or more radial vent holes 123 penetrate through the flange of the cylinder rod end 144 and intersect its counterbore 145. The venting provided by the vent holes 123 prevent a hydraulic lock being formed by air trapped between carrier cylinder 122 and the counterbore 145 of the cylinder rod end 144.

The cylinder body 111 of the relief valve operating cylinder 110 externally is a short stepped cylinder having at its first end a flange with a larger diameter adjacent where it is attached to the end of the relief valve body 102 opposed to the valve outlet end. The attachment of cylinder body 111 and the relief valve body 102 is made by threaded fasteners (not shown) inserted in a bolt hole circle (not shown) having the same pattern as the bolt hole circle in the adjacent end of the valve body. One or more shallow radial vent outlet grooves 124 are cut in the transverse face of the cylinder body on its first end.

The cylinder body 111 has a large bore 114 extending most of its length which is a close slip fit to the outer diameters of both the piston 113 and the upper cylindrical end of the cylinder rod end 144. A short drilled and tapped through bore penetrates the reduced outer diameter portion of the cylinder body 111 at its second end. Radial ports 115 and 116 tapped at their external ends penetrate between the exterior of cylinder body 111 and the bore 114 respectively near the first and second ends of the cylinder body.

Opening port 115 admits fluid to urge the relief valve 101 open, while closing port 116 admits fluid to urge the relief valve 101 closed. Threaded fittings 147 are used to connect between ports 115 and 116 of the cylinder body 111 and supply lines 66 and 73 of the control and operator system 11. These ports 115, 116 accommodate the hydraulic flows from the control and operator system 11. These controllable flows through ports 115, 116 cause the relief valve assembly 101 to move reversibly between its closed and open positions. A male seal on the external second end of cylinder rod end 144 seals between the cylinder rod end and the large bore 114 of the cylinder body 111.

The piston 113 of the relief valve operating cylinder is a short cylindrical disk which externally is a close slip to the bore 114 of the cylinder body 111. An annular seal located in a male groove on the periphery of the piston 113 seals between the piston and the bore 114. The piston 113 has a threaded section of its through bore and a short straight counterbore on its opposed end which faces the relief valve body 102.

The cylinder rod 112 is an elongate cylinder having a first male thread located at a first end and a second male thread at its second end. A male seal groove is closely located inwardly from the interior end of the second male thread at its second end. The first male thread is threadedly engaged with the female thread on the end of the carrier cylinder 122 opposed to the end attached to the sealing plug 103. The second male thread of the cylinder rod 112 is engaged with the thread of the piston 113, and a male seal in the groove of the cylinder rod seals between the rod and the piston. The piston end of the cylinder rod 112 is tapped and threadedly engaged with elongated cylindrical tattletale rod 80.

The tattletale guard 81 is a hollow externally threaded nut having a short external hex flange and an extended sleeve section on its end opposed to the threads. The extended sleeve section has multiple circumferentially spaced elongated slots, while the threaded end of the tattletale guard has a female seal groove and seal in its bore. The bore of the tattletale guard 81 is a close slip fit to the tattletale rod 80, and the female seal in the tattletale guard seals therebetween. The thread of the tattletale guard 81 is sealingly engaged with the external end of the thread of the throughbore of the cylinder body 111 so that the sleeve section of the tattletale guard is externally visible. The length of the tattletale rod 80 is selected so that it is not visible in the slots of the tattle guard 81 when the relief valve 101 is closed, but becomes visible there when the relief valve 101 is open.

The cylindrical poppet 138 of the relief valve 101 is biased towards its closed, seated position against its seat 106 both by the retained mud system pressure while the valve is closed and by hydraulic pressure maintained on the piston side of a hydraulic cylinder 110. The hydraulic relief valve operating cylinder 110 that operates the relief valve 101 has the first end of its cylindrical rod 112 externally threadedly attached to the drilled and tapped end of the carrier cylinder 122 on the end opposed to the sealing plug 103. The opposed end of the rod 112 has a similar male thread and is threadedly attached to a drilled and tapped through hole in the cylindrical disk piston 113 of the operating cylinder 110.

The Control and Operator System

Figure 6:
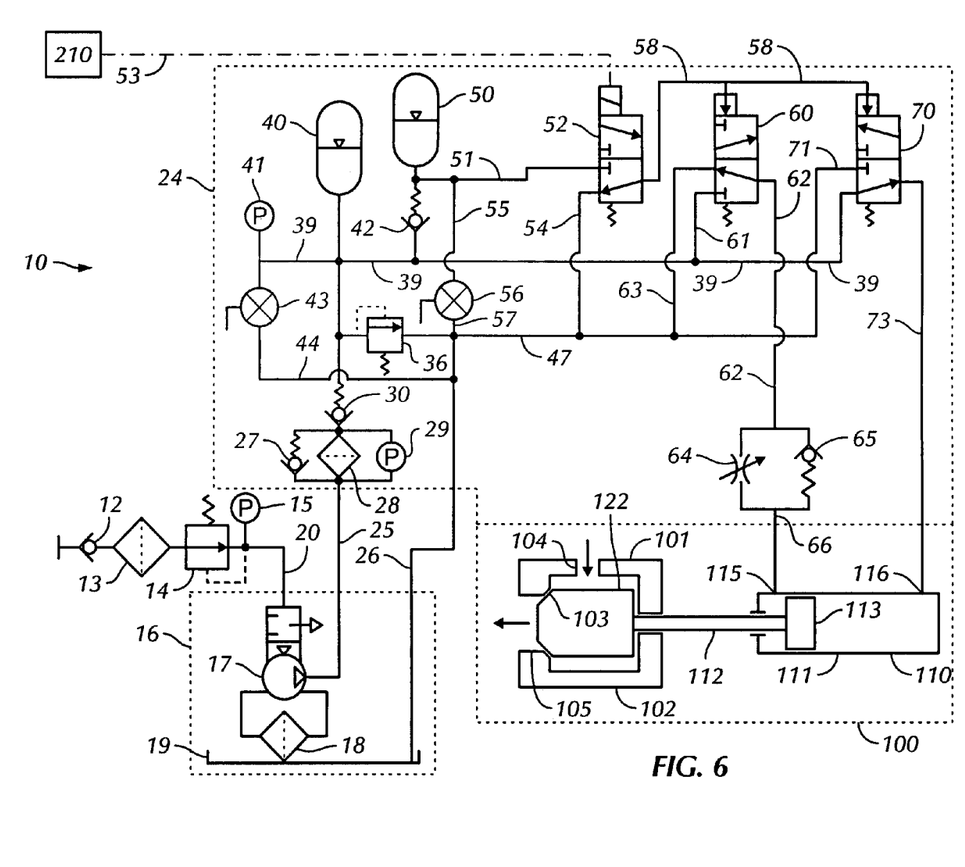
FIG. 6 shows the control valve system hydraulic schematic.

An important element in achieving the rapid response time for the relief valve 101 is the choice of the configuration of the hydraulic circuit for the relief valve control and operator system 11 and the constituent elements of that hydraulic circuit. Referring to FIG. 6, the circuit is described using conventional hydraulic symbols.

The relief valve control and operator system 11 consists of an air supply system for providing a conditioned air supply, the integrated hydraulic pump and reservoir 16, the manifold block 24 mounting the control valving and other system elements, and the accumulators 40, 50 which are directly mounted on the manifold block 24. The relief valve control and operator system 11 is directly mounted on the body 102 of the relief valve assembly 101.

Starting from the lower lefthand corner of the drawing and proceeding sequentially, rig air from a remote source (not shown) enters the control and operator system 11 through a quick connect fitting 12, passes through a filter 13 and a pressure regulator 14 with an output pressure gauge 15 to an air-driven hydraulic pump system 16 via air delivery line 20. The pneumatically driven hydraulic pump system 16 has its own integrally mounted tank or reservoir 19 and inlet filter 18.

Output from the pneumatically driven pump 17 passes into the balance of the system 11 by way of pressure delivery line 25 having an intermediately positioned high pressure filter assembly consisting of parallel mounted components 27, 28, and 29. High pressure filter 28 has both an associated bypass check valve 27 and differential pressure gauge 29 for monitoring pressure losses in the filter 28. A check valve 30 mounted downstream of the high pressure filter assembly prevents backflow towards the pump 17 through the pressure delivery line 25. A system pressure relief valve 36 is located immediately downstream from the outlet check valve 30 for the high pressure filter assembly. Any relieved overpressure outflow from relief valve 36 is able to return to the reservoir 19 by way of flow return line 26.

Normal conditioned flow from the pump 17 passes by way of pressure delivery line 25 to primary pressure supply header 39. Primary pressure supply header 39 supplies both accumulators 40 and 50, a first control valves 60 and a second control 70 both pilot operated directional valves, and also selectably operable manually operated system drain valve 43. Drain valve 43 is used to bleed pressure from accumulator 40 whenever the mud pump system is either inoperative or being serviced. Valve 43 exhausts accumulator 40 through outlet line 44 which is in turn connected to the flow return line 26.

The secondary accumulator 50, typically the smaller accumulator, is isolated from primary accumulator 40 by check valve 42 located in the charging line for accumulator 50. The charging pressure for the accumulators 40 and 50 is measured by pressure gauge 41 connected to primary pressure supply header 39. Selectably operable manual ball valve 56 connected to smaller accumulator 50 by delivery line 51 and drain line 55 permits selective draining of accumulator 50, with the draining flow from valve 56 through line 57 to flow return line 26 and the hydraulic system tank reservoir 19.

Three way 2 position solenoid operated spring return directional valve 52 is shifted from its spring biased unactivated position by an integral solenoid, with the power applied to the solenoid over signal line 53 from the programmable electronic controller 210. The electronic controller rapidly applies power within a few milliseconds to the solenoid of valve 52 in the event of electronically measured mud pump system overpressure.

Valve 52 has its two inlet ports and one outlet port. The normally connected inlet port is attached to vent line 54 which in turn is connected to the control valve drain line 47 and thence to flow return line 26. The normally unconnected inlet port of valve 52 is connected to delivery line 51 from accumulator 50. The single outlet side port of valve 52 is connected to pilot pressure line 58, which is in turn connected to the pilot ports of both the first piloted control valve 60 and the second piloted control valve 70.

Three way 2 position pilot operated spring return directional valve 60 is shifted from its spring biased unactivated position by pilot pressure delivered by pilot pressure line 58, with the pressure valved by solenoid operated valve 52. Valve 60 has its two inlet ports and one outlet port. The normally connected inlet port is attached to drain line 63 which in turn is connected to the control valve drain line 47 and thence to flow return line 26. The normally unconnected inlet port of valve 60 is connected by line 61 to primary pressure supply line 39 from the accumulator 40.

The single outlet side port of valve 60 is connected to opening pressure line 62, which is bifurcated to supply parallel needle valve 64 and check valve' 65. Check valve 65 permits flow to pass from valve 60, but stops reverse flow back towards valve 60 in its branch. The flow paths on the side of valves 64 and 65 away from valve 60 recombine into connection 66 which supplies opening port 115 on the relief valve control cylinder 110. In its spring biased normal position, valve 60 drains fluid away from the opening side of the relief valve operating cylinder 110.

Three way 2 position pilot operated spring return directional valve 70 also is shifted from its spring biased unactivated position by pilot pressure delivered by pilot pressure line 58, with the pressure valved by solenoid operated valve 52. Valve 70 has two inlet ports and one outlet port. The normally connected inlet port is attached to primary pressure supply line 39 which in turn is connected to accumulator 40. The normally unconnected inlet port of valve 70 is connected to drain line 71 and thence to control valve drain line 47 and flow return line 26. The outlet port of valve 70 is connected to supply line 73 which is in turn connected to closing port 116 on the valve closing piston side of relief valve operating cylinder 110.

The preceding description describes a control system 10 wherein when the solenoid valve 52 is deenergized, the pressure relief valve 101 is closed. In the event that it is desired that the control system 10 maintains the pressure relief valve 101 closed whenever the solenoid valve 52 is energized and then opens the pressure relief valve 101 whenever the solenoid valve 52 is deenergized, this is achieved by interchanging the locations of directional valves 60 and 70. If this is done, then energizing the solenoid of valve 52 applies pilot pressure to shift both interchanged valves 60 and 70. For this situation, valve 70 then vents fluid from the rod end of cylinder 110 while valve 60 supplies fluid to the piston end of the cylinder 110. This situation holds the pressure relief valve 101 closed until the signal to the solenoid of valve 52 is removed.

For some users of the present invention, this latter arrangement is preferable, since if electrical power to the system 10 fails, the rig mud pumps will be protected from overpressure. However, the venting of the mud system by the pressure relief valve does not allow for the circulation of mud until the power is restored.

Operation of the Invention

While the power source for creating the hydraulic pressure and flow to operate the relief valve and its control system is pressurized air provided by a remote outside source (the rig with the mud pump or pumps), the system utilizes the accumulators 40 and 50 to store the hydraulic pressure and flow necessary to operate the relief valve assembly 101 and its control and operator system 11. This utilization of the two accumulators 40 and 50 makes the relief valve response time substantially independent of the pneumatic power transfer rate. This independence is in large part a result of the sizing of the accumulators 40 and 50 and the fact that the relief valve does not cycle quickly.

When the control and operator system 11 of the present invention is powered up, the mud pumps are temporarily shut down and venting ball valves 43 and 56 are closed. At that point, the air supply is turned on. Air passing through the quick connect 12 and conditioned by the filter 13 and the regulator 14 causes the pneumatically driven pump 17 to deliver hydraulic flow. The delivered hydraulic flow passes through pressure delivery line 25. As the fluid passes through the delivery line 25 it is filtered by the high pressure filter 28 and has its pressure regulated by relief valve 36 before entering and fully charging both accumulators 40 and 50. Once the accumulators 40 and 50 are fully charged, check valve 42 causes them to behave independently.

The accumulator 50 pressure and flow potential are used for piloting valves 60 and 70 which operate in parallel to control the position of the hydraulic cylinder 110 which opens and closes the relief valve 101. Since the volumes required to simultaneously pilot both valves 60 and 70 are quite small, accumulator 50 is typically smaller than accumulator 40, which must deliver higher flow volumes. The pressure and flow potential of accumulator 40 are used directly to shift the relief valve operating cylinder 110 that responds to flows passing through pilot operated valves 60 and 70 in response to piloting pressure from piloting valve 52.

Following the charging of accumulators 40 and 50, the relief valve assembly 101 is closed so that the mud pumps can be used for their intended purposes. An electronic pressure sensor continuously measures system pressure, which is monitored by a programmable logic controller ("PLC") 210. In the event that excessive pressure is determined by the PLC 210 through a comparison of a desired pressure and the actual measured pressure, the PLC 210 transmits a signal with sufficient power down the solenoid on/off power cable 53 to the solenoid of valve 52. Such a signal on power cable 53 causes the solenoid valve 52 to quickly shift so that the pressure and flow from accumulator 50 passes through valve 52 and into the pilot pressure line 58.

Pilot pressure from valve 52 on line 58 causes both valves 60 and 70 to shift from their normal positions. When valves 60 and 70 shift from their normal positions, pressure and flow from larger accumulator 40 passes through valve 60 and through supply line 62, both needle valve 64 and check valve 65, and then through connecting line 62 and into the opening port 115 of cylinder 110 to urge cylinder 110 to retract rod 112 and open the relief valve 101.

At the same time, pressure from accumulator 40 is removed from its previous connection through valve 70 and supply line 73 to closing port 116 of cylinder 110. The hydraulic fluid on the piston side of cylinder 110 is vented from cylinder 110 through valve 70 to tank 18 through lines 71, 47, and 26 as the piston 113 of cylinder 110 is urged to open the valve 101 by the higher pressure fluid entering the cylinder 110 on its rod end. When the sealing plug 103 of the valve 101 is lifted from its seat 106, the mud pump system fluid is vented through outlet port 105 of the relief valve 101.

Normally, it is desirable for the mud pumps to be shut off following system venting by the relief valve 101 so that the problem can be determined and rectified. During such a waiting period, the hydraulic pump 17 will fully recharge the accumulators 40 and 50. Reclosing the relief valve 101 is accomplished by having the PLC remove the signal on power cable 53. This permits the spring of valve 52 to shift valve 52 to its normal position so that the piloting pressure on pilot pressure line 58 is vented through valve 52 to tank 19.

When the pilot pressure on line 58 is vented, the springs on valves 60 and 70 return those valves to their normal positions so that pressure is removed from the rod side of cylinder 110 and applied to the piston side of cylinder 110. Consequentially, rod 112 of cylinder 110 is urged forward. The flow coming out of the rod end of cylinder 110 cannot pass through check valve 65, so the flow is restricted during passage through restrictor needle valve 64 as the flow is returned to tank 18. This slows reclosure of relief valve 101 so that the sealing plug 103 and the seat 106 are not damaged during valve reseating.

Advantages of the Invention

The provision of operating fluid supplies for achieving quick relief valve opening from close coupled accumulators, flow connections, and control valves markedly decreases relief valve response times. This avoidance of reliance on typically remote and slowly responding pumps to provide the most significant part of the actuation oil during the actual relief valve opening reduces relief valve opening times more than enough (i.e., by more than halving of response time) to reliably avoid mud system damage even when the system pumps are deadheaded into a closed system.

Utilization of a close coupled design based on a manifold block for housing most of the flow paths and hydraulic system valves markedly improves hydraulic system response time. Use of a rapid response solenoid controlled valve to pilot the main piloted three way two position flow control valves further improves system response time. Use of two separate piloted three way valves, one for each side of the relief valve operating cylinder, reduces flow restrictions to also improve relief valve response time.

System construction using cartridge valves and a manifold block reduces leakage and the probability of in service damage. Other system advantages may be obvious to those skilled in the art.

It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

What is claimed is:

1. A pressure relief valve control system comprising:
(a) a normally closed relief valve having a selectably operable double acting cylinder with a first port and a second port, wherein the cylinder moves to a first position or a second position in response to changes in measured fluid pressure changes, wherein increased fluid pressure in the first port moves the cylinder to the first position to open the relief valve and increased fluid pressure in the second port moves the cylinder to the second position to close the relief valve;
(b) a hydraulic pump and a hydraulic reservoir;
(c) a first accumulator and a second accumulator charged by the hydraulic pump from fluid in the reservoir; and
(d) a valve control system including
(i) a pressure sensing device for monitoring the fluid pressure changes,
(ii) a solenoid controlled valve responsive to the pressure sensing device and in fluid communication with the first accumulator, the reservoir, and a pilot pressure line;
(iii) a first control valve connected to a first side of the cylinder, wherein the first control valve is in fluid communication with the second accumulator, the pilot pressure line, the reservoir, and the first port; and
(iv) a second control valve connected to a second side of the cylinder, wherein the second control valve is in fluid communication with the second accumulator, the pilot pressure line, the reservoir, and the second port;
whereby whenever the pressure sensing device senses a fluid pressure greater than a predetermined pressure an electronic signal is sent to the solenoid operated valve that opens the pilot pressure line to a fluid pressure in the second accumulator thereby activating the first and second control valves to open the relief valve.

2. The pressure relief valve control system of claim 1, further comprising a programmable logic controller.

3. The pressure relief valve control system of claim 2, wherein the programmable logic controller sends an electronic signal to open the solenoid operated valve in response to any fluid pressure greater than a predetermined pressure.

4. The pressure relief valve control system of claim 1, wherein the first accumulator is dedicated to the solenoid controlled valve.

5. The pressure relief valve control system of claim 1, wherein the first and second control valves are pilot operated.

6. The pressure relief valve control system of claim 1, wherein the second accumulator is dedicated to the first and second control valves.

7. The pressure relief valve control system of claim 6, wherein the fluid pressure and flow potential of the second accumulator are used for piloting the first and second control valves.

8. The pressure relief valve control system of claim 1, wherein the first and second control valves operate in parallel to open and close the relief valve.

9. The pressure relief valve control system of claim 1, wherein the hydraulic pump and the reservoir are coupled to the pressure relief valve.

10. The pressure relief valve control system of claim 9, wherein the solenoid controlled valve, the first and second control valves, and the first and second accumulators are mounted on a manifold block that is adjacent the hydraulic pump and the reservoir.

11. The pressure relief valve control system of claim 1, wherein the solenoid controlled valve is a two position spring return directional valve.

12. The pressure relief valve control system of claim 1, wherein the first and second control valves are two position pilot operated spring return directional valves activated by pressure delivered by the pilot pressure line.

13. A pressure relief valve control system comprising:
 (a) a normally closed relief valve having a selectably operable double acting cylinder with a first port and a second port, wherein the cylinder moves to a first position or a second position in response to changes in measured fluid pressure changes, wherein increased fluid pressure in the first port moves the cylinder to the first position to open the relief valve and increased fluid pressure in the second port moves the cylinder to the second position to close the relief valve;
 (b) a hydraulic pump and a hydraulic reservoir;
 (c) a first accumulator and a second accumulator charged by the hydraulic pump from fluid in the reservoir; and
 (d) a valve control system closely coupled to the relief valve, the hydraulic pump and reservoir, and the first and second accumulators, wherein the valve control system includes
  (i) a pressure sensing device for measuring fluid pressure changes,
  (ii) a programmable logic controller for monitoring the fluid pressure changes and sending out an electronic signal whenever the measured fluid pressure exceeds a predetermined desirable pressure,
  (iii) a solenoid controlled valve responsive to the electronic signal from the programmable logic controller and in fluid communication with the first accumulator and a pilot pressure line;
  (iv) a first control valve connected to a first side of the cylinder, wherein the first control valve is in fluid communication with the second accumulator, the pilot pressure line, the reservoir, and the first port; and
  (v) a second control valve connected to a second side of the cylinder, wherein the second control valve is in fluid communication with the second accumulator, the pilot pressure line, the reservoir, and the second port;
 whereby whenever the solenoid operated valve responds to the electronic signal to open the pilot pressure line to a fluid pressure in the second accumulator thereby activating the first and second control valves to open the relief valve.

14. The pressure relief valve control system of claim 13, wherein the first accumulator is dedicated to the solenoid controlled valve.

15. The pressure relief valve control system of claim 13, wherein the first and second control valves are pilot operated.

16. The pressure relief valve control system of claim 13, wherein the second accumulator is dedicated to the first and second control valves.

17. The pressure relief valve control system of claim 16, wherein the fluid pressure and flow potential of the second accumulator are used for piloting the first and second control valves.

18. The pressure relief valve control system of claim 13, wherein the first and second control valves operate in parallel to open and close the relief valve.

19. The pressure relief valve control system of claim 13, wherein the solenoid controlled valve, the first and second control valves, and the first and second accumulators are mounted on a manifold block that is adjacent the hydraulic pump and the reservoir.

20. The pressure relief valve control system of claim 13, wherein the first and second control valves are two position pilot operated spring return directional valves activated by pressure delivered by the pilot pressure line.

* * * * *